March 22, 1966　　F. H. MUELLER　　3,241,570
BY-PASS METER STOP
Filed Sept. 17, 1962　　3 Sheets-Sheet 1
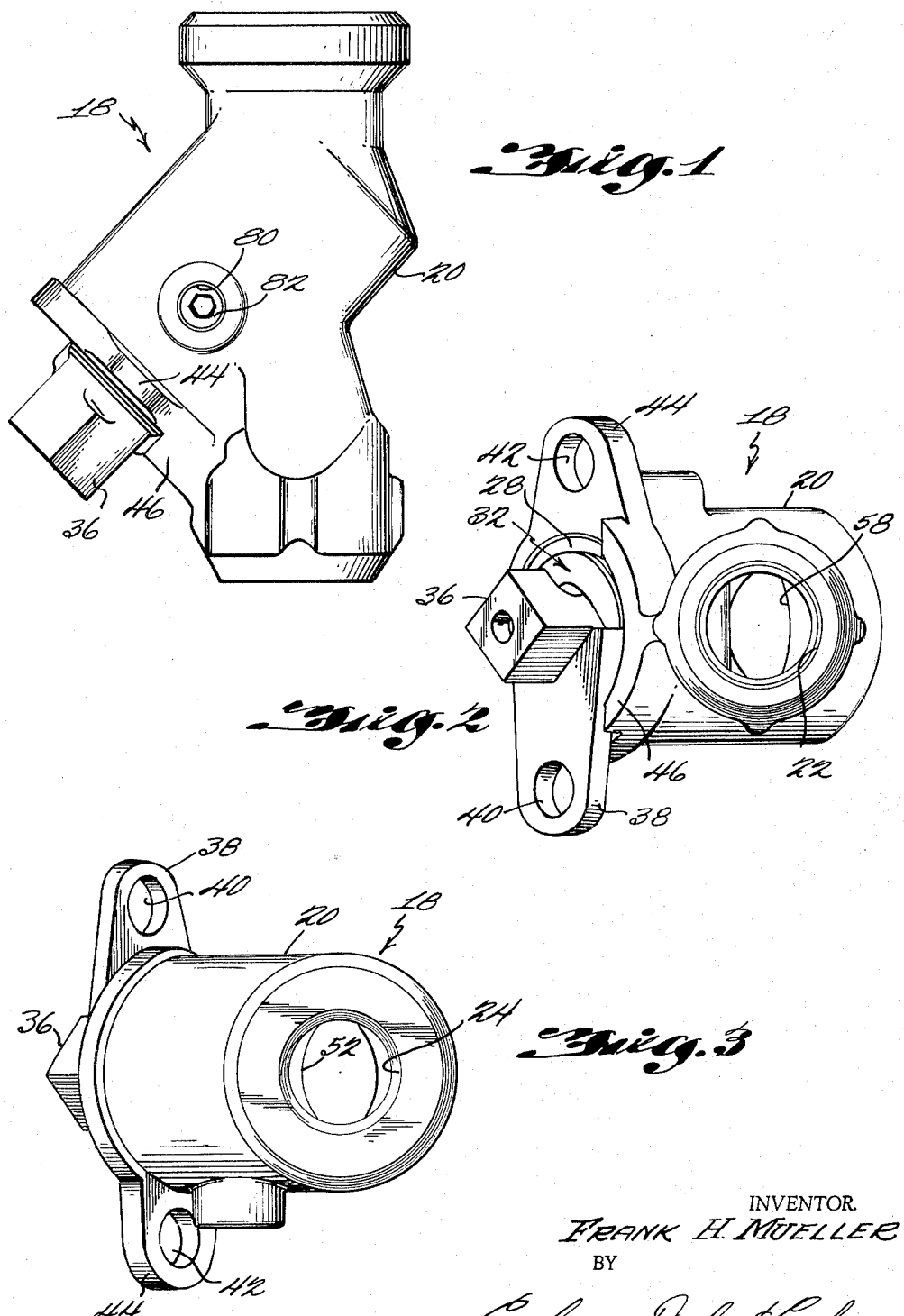
INVENTOR.
FRANK H. MUELLER
BY
Cushman, Darby & Cushman
ATTORNEYS March 22, 1966   F. H. MUELLER   3,241,570
BY-PASS METER STOP Filed Sept. 17, 1962   3 Sheets-Sheet 2

INVENTOR.
FRANK H. MUELLER
BY
Cushman, Darby & Cushman
ATTORNEYS

March 22, 1966  F. H. MUELLER  3,241,570
BY-PASS METER STOP
Filed Sept. 17, 1962  3 Sheets-Sheet 3
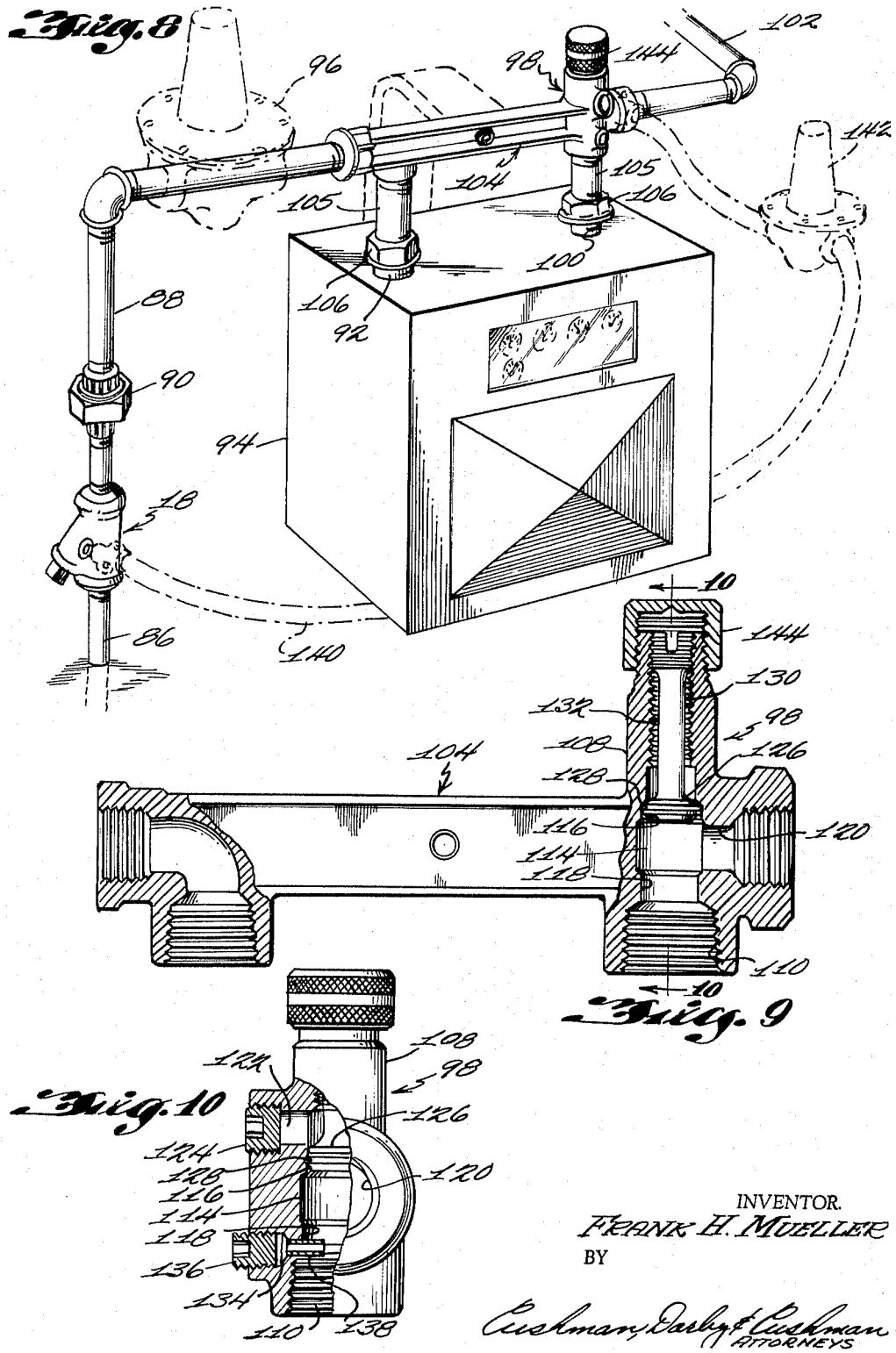
INVENTOR.
FRANK H. MUELLER
BY
Cushman, Darby & Cushman
ATTORNEYS

United States Patent Office 3,241,570
Patented Mar. 22, 1966

3,241,570
BY-PASS METER STOP
Frank H. Mueller, Decatur, Ill., assignor to Mueller Co., Decatur, Ill., a corporation of Illinois
Filed Sept. 17, 1962, Ser. No. 223,882
5 Claims. (Cl. 137—625.16)

This application relates to rotary plug valves and, more particularly, to rotary plug valves of a type commonly termed a meter stop which is especially adapted for use ahead of a household gas meter. The invention also relates to a gas meter stop which can be used for connecting a by-pass line around the meter so that the latter can be removed for repair or replacement purposes. Additionally, the invention relates to improvements in valves of the type shown in my prior Patents 2,631,002 and 3,030,975.

Rotary plug valves of the type shown in the aforementioned patents have a body provided with a cylindrical valve seat in which is rotatably received a tubular valve plug having a lateral port movable into and out of registration with a lateral port in the seat to open and close the valve. One end of the plug is closed and the other is open and flow through the valve takes place through the open end of the plug and through a passageway in the valve body which communicates directly with the plug open end. The valve is extremely effective because the plug is provided with a diagonally disposed groove which encircles both the plug and the radial projection of the center of the plug port in a plane which passes between the plug port and the closed end of the plug. An O-ring, or its equivalent, is disposed in the groove to seal with the opposed surface of the seat. The O-ring provides an extremely effective seal against through leaks in the closed position of the valve, and also an extremely effective seal against leaks to atmosphere in the open position of the valve. Desirably, the plug is provided with a stem that extends outwardly of the seat to the exterior of the valve body, and such stem also is sealed to the body by means of an O-ring, or its equivalent, so as to provide an effective seal against leakage to atmosphere in the closed position of the valve and an additional seal against leakage to atmosphere in the closed position of the valve.

Valves of the aforedescribed type possess the disadvantage, however, that the flow way therethrough has a right angle turn so that the valve cannot be removed and replaced, without shutting off service, by means of a stop changer of the type disclosed, for example, in the patent to Bowan No. 2,867,034. Moreover, the valves shown in the aforementioned patents are not capable of being used for by-pass purposes, as mentioned above.

Accordingly, it is an object of this invention to provide an improved valve of the type shown in the aforementioned patents but which has a straight flow way therethrough so that the valve can be removed and replaced, without shutting off service, by means of a stop changer.

It is another object of this invention to provide an improved valve of the type under consideration that can be used for by-passing purposes.

Other objects and advantages of the invention will be apparent from the following description and accompanying drawings in which:

FIGURE 1 is a side elevational view of a valve embodying this invention.

FIGURE 2 is a bottom view of the valve shown in FIGURE 1.

FIGURE 3 is a top view of the valve shown in FIGURE 1.

FIGURE 8 is a view showing a typical installation of a valve embodying this invention and with a by-pass line attached.

FIGURE 9 is an enlarged vertical sectional view of the meter outlet fitting shown in FIGURE 8.

FIGURE 10 is a sectional view taken on line 10—10 of FIGURE 9.

Figure 4:
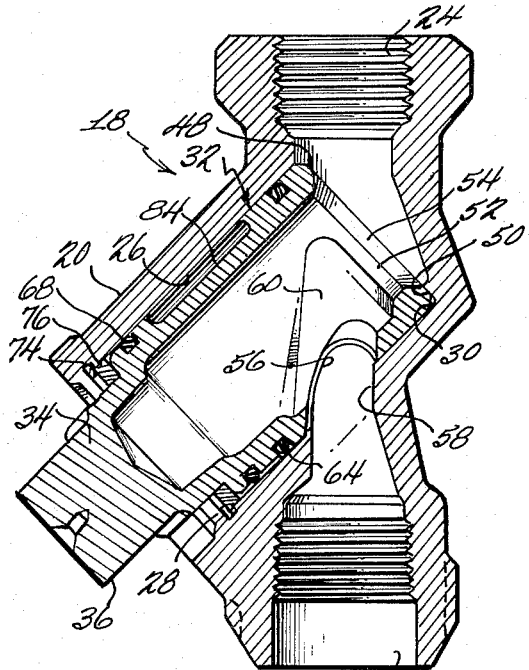
FIGURE 4 is a vertical sectional view of the valve shown in FIGURE 1 with the valve being shown in open position.

Referring now to FIGURES 1–7 of the drawings, there is shown therein a rotary plug valve 18 provided with a body 20 having aligned inlet and outlet passageways 22 and 24, respectively, which are interiorly threaded at their outer ends for the connection of the valve into a line, as shown in FIGURE 8. The body 20 is provided with a cylindrical bore defining a valve seat 26 having an open outer end 28 and an inner end 30 which communicates directly with the inner end of the outlet passageway 24. The axis of the seat 26 is disposed at an acute angle to the axes of the aligned passageways 22 and 24. Rotatably received in the seat 26 is a cylindrical tubular valve plug 32 having a closed outer end 34 (FIGURE 4) provided with an extension or stem 36 that is noncircular in cross-section, e.g., square, as shown in the drawings, for engagement by an appropriate wrench (not shown) to turn the plug to open and close the valve 18. The extension 36 also is provided with a radial lock wing 38 (FIGURES 2 and 3) having a hole 40 therein registrable in the closed position of the valve 18 with a hole 42 in a corresponding lock wing 44 integral with the body 20 so that an appropriate locking device (not shown), such as a padlock, can connect the two rings to lock the valve in its closed position. The body 20 also is provided with a segmental extension 46 at the open end 28 of the seat 26 having the opposite ends thereof alternatively engageable by the opposite sides of the plug lock wing 38 to limit the rotational movements of the plug 32 to 180° in turning between open and closed positions of the valve 18.

The inner end 48 of the plug 32 seats against a segmental ledge 50 formed at the inner end 30 of the valve seat 26, and the inner end of the plug is open, as at 52, and communicates directly with the inner end of the outlet passageway 24. Preferably, the inner end of the outlet passageway 24 is enlarged and contoured to the same size as the circular opening 52 in the inner end 48 of the plug 32. Additionally, the edges of the opening 52 preferably are chamfered, as at 54, so as to increase the minimum transverse dimensions of the flow way through the valve.

The plug 32 also is provided with a lateral port 56 registrable with a seat port 58 at the inner end of the inlet passageway 22 in the open position of the valve 18. It will be noted, as shown in FIGURE 4, that the inlet and outlet passageways 22 and 24, together with the seat port 58, plug port 56 and the opening 52 in the end of the plug, define a straight flow way through the valve 18, the configuration defined by the transverse dimensions of which are determined largely by the size of the opening 52 at the inner end 48 of the plug 32. Since the opening 52 at the inner end of the plug 32 is cylindrical, the aforementioned configuration defined by the minimum transverse dimensions of the flow way will be elliptical, as shown in FIGURE 3. Consequently, the seat port 58 and the plug port 56 desirably are contoured to conform to the aforementioned elliptical configuration. Additionally, the edges of the plug port 56 are shaped, and even the inner surface of the plug surrounding the port is cut away, as at 60 (FIGURE 4) in order to conform the flow way, in the open position of the valve, as closely as possible to the aforementioned elliptical configuration defined by the angled relationship between the circular opening 52 at the inner end of the plug 32 and the axis of the flow way. At least the major dimension of the ellipse defined by the plug and seat ports 56 and 58 should be as large as the major dimension of the ellipse defined by the circular opening 52. Such major dimension is substantially as large as the inside diameter of a pipe connected to the inlet passageway 22. By reason of such elliptical configuration, a stop changer of the type shown in the aforementioned Patent No. 2,867,034 can be used to remove and replace the valve 18 without shutting off service. Such a changer uses a resilient stopper that is substantially rectangular in cross-section so as to be insertable through a flow way the minimum transverse dimensions of which define an ellipse.

Figure 5:
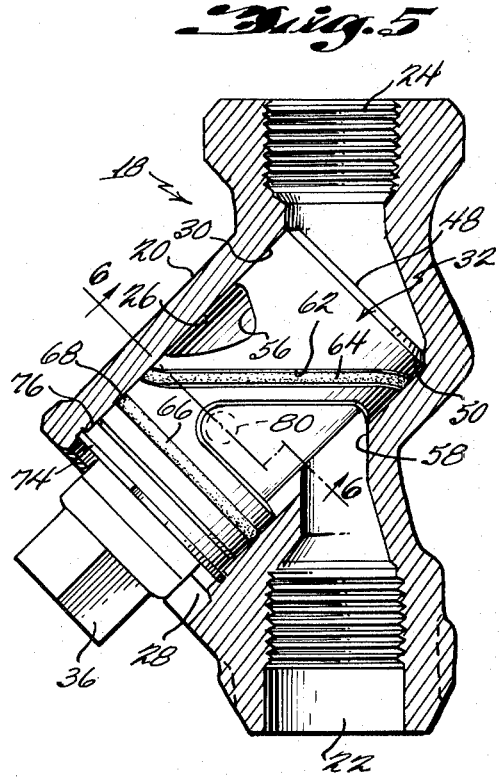
FIGURE 5 is a view corresponding to FIGURE 4 but showing the valve plug in elevation and in closed position.

The outer surface of the plug 32 is provided with a diagonal groove 62 (FIGURE 5) which encircles both the plug and the radial projection of the center of the plug port 56 in a plane which passes between the plug port and the closed end 34 of the plug, as shown in FIGURES 4 and 5. Disposed in the groove 62 is a resilient packing ring 64, e.g., a conventional O-ring, which seals both with the bottom and/or side walls of the groove and with the seat 26, as described more in detail in the aforementioned Patents 2,631,002 and 3,030,975. The plug 32, between its outer end 34 and the O-ring 64, also is provided with a circumferential groove 66 in which is disposed another resilient packing ring 68, e.g., a conventional O-ring, which provides another seal between the plug and the seat 26. It will be seen that when the valve 18 is open, as shown in FIGURE 4, both of the O-rings 64 and 68 provide effective seals between the plug 32 and seat 26 to prevent escape of fluid from the flow way to the atmosphere at the open end 28 of the seat. It will be seen that in the closed position of the valve 18, shown in FIGURE 5, the O-ring 64 provides an effective seal between the plug 32 and seat 26 to prevent leakage of fluid from the inlet passageway 22 to the outlet passageway 24, while at the same time, the O-ring 68 provides an effective seal between the plug and seat to prevent leakage of fluid from the inlet 22 to the atmosphere at the open end 28 of the seat.

Figure 7:
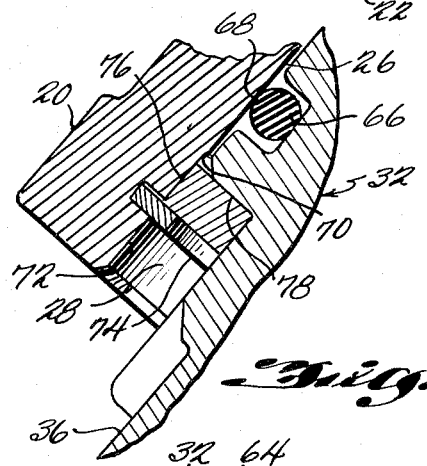
FIGURE 7 is an enlarged fragmentary sectional view of a portion of FIGURE 4.

Outwardly beyond the O-ring 68 the seat bore, as shown best in FIGURE 7, is provided with an outwardly diverging section 70 which merges with a radially enlarged section 72 having a diameter substantially at least as large as the outer diameters of the two O-rings 64 and 68 when they are uncompressed, i.e., when the O-rings are in their relaxed position in their corresponding grooves 62 and 66 and project slightly therefrom preparatory to inserting the plug 32 into its seat 26. A snap ring 74 is detachably engageable in a circumferential groove in the bore section 72 and overlaps a retaining collar 76 seated against an outwardly facing shoulder 78 on the plug 32 adjacent its closed end 34 in order to retain the plug in the seat 26, and substantially in engagement, at its inner end 48, with the ledge 50 at the inner end 30 of the seat. It will be seen that by reason of the enlarged diameter of the bore section 72, and the diverging bore section 70, that the plug 32, with the O-rings 64 and 68 assembled thereto, can be inserted into the seat 26 without damaging the O-rings by engagement with the inner edge of the snap ring groove in their passage therepast.

Figure 6:
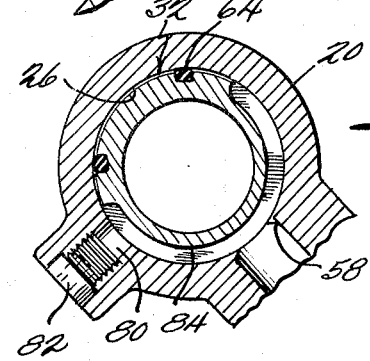
FIGURE 6 is a sectional view taken substantially on line 6—6 of FIGURE 5.

The valve body 20 is provided with a by-pass port 80 which opens to the seat 26 at a location spaced circumferentially substantially 90° from the seat port 58 and disposed between the two O-rings 64 and 68 on the plug 32 in the closed position of the valve 18, as shown in FIGURES 5 and 6. The port 80 is provided with a detachable closure 82, shown in the drawings as being in the form of a threaded plug provided with a hexagonal socket for engagement by an Allen wrench. In order to provide communication between the inlet passageway 22 and the by-pass port 80 in the closed position of the valve 18, for reasons later explained, the surface of the plug 32 is provided with a recess 84 which extends somewhat more than 180° circumferentially of the plug, as shown in FIGURES 5 and 6. The recess 84 is circumferentially extended, as aforedescribed, so that when the plug 32 is turned from full open to full closed position, communication will be established between the inlet passageway 22 and the by-pass port 80 before communication is shut off between the inlet and outlet passageways 22 and 24, and also so that in turning between full closed and full open positions, communication from the inlet passageway 22 to the outlet passageway 24 will be established before communication between the inlet passageway 22 and the by-pass port 80 is shut off.

Turning now to FIGURE 8 of the drawings there is shown a typical installation of a by-pass meter stop 18 embodying this invention. In such an installation, a buried service line or pipe (not shown) usually is connected, below ground and adjacent a dwelling, to a sturdier riser pipe 86. The inlet 22 of a valve 18 embodying this invention is connected to the upper end of the riser pipe 86, and a line 88, usually having a union 90 therein, is connected to the outlet 24 of the valve and leads to the inlet 92 of a conventional gas meter 94. Frequently, a pressure regulator 96 is connected into the line 88 between the valve 18 and the meter 92 in order to reduce the high pressure of the gas service to a lower pressure suitable for use in a dwelling. A by-pass fitting 98, of the type disclosed in greater detail in the copending application of Frank H. Mueller, Serial No. 229,704, now U.S. Patent No. 3,187,570, is connected between the meter outlet 100 and a line 102 leading to the house piping (not shown). This fitting 98, shown in detail in FIGURES 9 and 10, may be a separate fitting or an integral part of a meter bar or meter hanger 104, as shown. Such hangers are shown and usually have a meter detachably suspended therefrom by nipples 105 and unions 106.

Referring now to FIGURES 9 and 10 of the drawings, the fitting 98 is somewhat in the nature of a spool valve having a body 108 provided at its lower end with an interiorly threaded inlet 110 for connection therein of the nipple 105 leading to the outlet 100 of the meter 94. The body 108 also is provided with a through bore 114 aligned with the inlet 110 and having upper and lower cylindrical sections 116 and 118 of uniform diameter. Between the bore sections 116 and 118, the body 108 is provided with a lateral outlet 120 to which is connected the line 102 leading to the house piping. Above the bore section 116 the body 108 is provided with a by-pass port 122 normally closed by a detachable closure in the form of a threaded plug 124 having a socket in its outer end for reception of an Allen wrench (not shown). Movable longitudinally in and between the bore sections 116 and 118 is a valve member 126 provided with a circumferential groove in which is disposed on O-ring 128 engageable with the wall of the bore sections 116 and 118 to seal therewith and with the valve member. The valve member 126 has a stem 130 provided with threads engaged with corresponding threads in a reduced upper section 132 of the bore 114 so that rotation of the stem, by an appropriate wrench (not shown) will serve to advance or retract the valve member 126. Below the bore section 118, the body 108 is provided with a lateral purge port 134 normally closed by a detachable closure 136, here shown as being in the form of a threaded plug having an Allen wrench-receivable socket in its outer end. A tubular rollpin 138 may be force-fitted into the inner end of the port 134 and project inwardly beyond the wall of the bore section 118 to prevent movement of the valve 126 below the bore section 118.

From the foregoing construction it will be seen that the valve member 126 is movable between three positions, one wherein it will block off flow between the by-pass port 122 and the outlet port 120, an intermediate position wherein flow can take place from both the inlet 110 and the by-pass port 122 to the outlet port 120, and one wherein flow from the inlet 110 to the outlet port 120 is blocked.

Referring now to FIGURE 8 of the drawings, in order to use the installation shown for by-passing purposes, with the meter stop 18 in its open position, the plug 82 closing the by-pass port 80 is removed and a by-pass line 140 connected to the by-pass port 80. Desirably, this line 140 will have a pressure regulator 142, similar to the regulator 96 connected thereinto. After the line 140 has been so connected to the meter stop 18, the latter is turned to an intermediate position wherein flow can take place from the inlet passageway 22 through both the line 88 and the by-pass line 140. Thus, the by-pass line 140 will be purged of air. Thereafter, and with the valve member 126 in the fitting 98 in its normal position of blocking flow from the by-pass port 122 to the outlet port 120, the plug 124 is removed and the other end of the by-pass line 140 connected to the by-pass port 122 of the fitting 98. Thereupon, the valve member 126 is moved to its intermediate position wherein flow can take place from both the meter 94 and the by-pass line 140 to the outlet 120. Thereafter, the meter stop 18 is turned to its closed position to shut off flow through the meter 94 and direct all flow of gas to the dwelling through the by-pass line 140. The valve member 126 then is moved to its position wherein it blocks flow from the meter 94 to the outlet 120. Thereupon the meter unions 106 can be unscrewed and the meter 94 detached for replacement or repair.

It will be noted that the foregoing procedure serves to by-pass the gas around the meter 94 without any interruption of the flow of gas to the dwelling so that there is no possibility of extinguishing pilot lights and thus creating a potentially dangerous situation.

After the meter 94 has been repaired and it, or a new meter, has been reconnected to the meter hanger 104, service is re-established by following a substantially reverse procedure. First of all, the closure plug 136 for the purge port 134 in the fitting 98 is removed and the meter stop 18 turned to its intermediate position so that gas will flow through the line 88 and through the meter 94, as well as through the by-pass line 140. Gas is allowed to flow in this manner until the line 88 and the meter 94 have been purged of air. This can be determined by watching the dials on the meter 94 since the volumetric capacity thereof normally is known. After the line 88 and meter 94 have been so purged, the closure plug 136 for the purge port 134 is re-inserted and tightened. The valve member 126 in the fitting 98 then is moved to its intermediate position to permit gas to flow from both the meter 94 and the by-pass line 140 to the pipe 102. The meter stop 18 then is turned to its full open position so that all flow of gas takes place through the line 88 and the meter 94 to the house pipe 102. The valve member 126 of the fitting 98 then is moved to its normal position to block flow between the by-pass port 122 and the house pipe 102, so that the by-pass line 140 can disconnected from the fitting 98 and the meter stop 18. A cap 144 desirably is screwed onto the top of the fitting 98 to protect the same from the weather.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A valve comprising a valve body having a circular bore forming a valve seat, a lateral inlet port in said seat; a lateral by-pass port in said seat communicating with the exterior of said body and spaced circumferentially from said seat inlet port; a pair of aligned inlet and outlet passageways extending at an acute angle to the axis of said seat, said outlet passageway communicating at its inner end with one end of said bore and said inlet passageway communicating at its inner end with said seat inlet port; a tubular valve plug rotatable in said seat to open and close the valve and having a closed end, an open end communicating with said outlet passageway, a lateral plug port registering with said seat inlet port in the open position of the valve, said passageway seat inlet port, plug port and plug open end defining a straight flow way in the open position of the valve; a circumferentially elongated recess in the outer surface of said plug extending on opposite sides of said seat inlet port providing communication between said seat ports in the closed position of the valve but interrupting said communication in the open position of the valve and so that as the plug is turned from open to closed position communication is established between said seat ports before the valve is closed and as the plug is turned from the closed to the open position the valve is opened before said communication is interrupted; a diagonally disposed groove in the outer surface of said plug encircling both said plug and the radial projection of the center of said plug port in a plane passing between said plug port and said plug closed end; a resilient sealing ring in said groove and compressed radially between the bottom thereof and the opposed surface of said seat to form a seal between said seat and said plug; said bore outwardly of said ring having a radially enlarged section of a diameter substantially at least as large as the diameter defined by the radial projection of said ring from said groove when uncompressed and a tapered section smoothly merging said enlarged section with said bore section; a circumferential groove in the wall of said enlarged section and a snap ring means in said enlarged section groove overlapping a shoulder on said plug to retain the latter in said seat, whereby in order to assemble said valve with said snap ring means removed and with the sealing ring disposed in said plug groove and projecting slightly therefrom, said plug can be inserted into the open end of said seat without damage to said packing ring in its passage past said enlarged section groove.

2. The structure defined in claim 1 in which the seat and plug are cylindrical and including a shoulder in the bore adjacent the open end of, and engaged by, said plug to restrain axial movement thereof.

3. The structure defined in claim 1 in which the edges of the plug port and of the plug open end are chamfered to enlarge and streamline the flow way through the plug.

4. The structure defined in claim 1 including a detachable closure for the by-pass port.

5. The structure defined in claim 1 including a circumferential groove in one of the opposed surfaces of the plug and seat between the recess and the closed end of the plug, and a resilient sealing ring in said groove engaged therewith and with the other of said surfaces.

(References on following page)

References Cited by the Examiner

UNITED STATES PATENTS

| | | | |
|---|---|---|---|
| 1,061,825 | 5/1913 | Dewey | 251—310 X |
| 2,578,396 | 12/1951 | Brown | 251—317 |

FOREIGN PATENTS

| | | |
|---|---|---|
| 528,117 | 4/1954 | Belgium. |
| 1,111,699 | 11/1955 | France. |
| 370,312 | 4/1939 | Italy. |
| 287,969 | 12/1952 | Switzerland. |

OTHER REFERENCES

"Handbook of O-Ring and Dyna-Seal Packings," July 8, 1954, page 43 relied on. (Copy available in Group 360 Library.)

M. CARY NELSON, *Primary Examiner.*

ISADOR WEIL, MARTIN P. SCHWADRON,
*Examiners.*